(12) United States Patent
Bohmeyer et al.

(10) Patent No.: US 10,563,724 B2
(45) Date of Patent: Feb. 18, 2020

(54) TORSIONAL VIBRATION DAMPER HAVING A BEARING DEVICE

(71) Applicant: Hasse & Wrede GmbH, Berlin (DE)

(72) Inventors: Stephan Bohmeyer, Hoppegarten (DE); Michael Steidl, Berlin (DE); Nobert Reinsperger, Hoppegarten (DE)

(73) Assignee: Hasse & Wrede GmbH, Berlin (DE)

( * ) Notice: Subject to any disclaimer, the term of this patent is extended or adjusted under 35 U.S.C. 154(b) by 0 days.

(21) Appl. No.: 15/906,405

(22) Filed: Feb. 27, 2018

(65) Prior Publication Data
US 2018/0187746 A1 Jul. 5, 2018

Related U.S. Application Data

(63) Continuation of application No. PCT/EP2016/070340, filed on Aug. 29, 2016.

(30) Foreign Application Priority Data

Aug. 31, 2015 (DE) .......................... 10 2015 114 534

(51) Int. Cl.
*F16F 15/173* (2006.01)
*F16C 17/10* (2006.01)

(52) U.S. Cl.
CPC ............ *F16F 15/173* (2013.01); *F16C 17/10* (2013.01); *F16C 2361/53* (2013.01);
(Continued)

(58) Field of Classification Search
CPC ...... F16F 15/14; F16F 15/1407; F16F 15/145; F16F 15/1457; F16F 15/1464;
(Continued)

(56) References Cited

U.S. PATENT DOCUMENTS 3,552,230 A 1/1971 McLean
5,058,453 A 10/1991 Graham et al.
(Continued)

FOREIGN PATENT DOCUMENTS

CN 102168736 A 8/2011
CN 202001549 U 10/2011
(Continued)

OTHER PUBLICATIONS

Machine Translation of EP 2,824,362, obtained Aug. 17, 2018.*
(Continued)

*Primary Examiner* — Richard W Ridley
*Assistant Examiner* — Brian J McGovern
(74) *Attorney, Agent, or Firm* — Crowell & Moring LLP (57) ABSTRACT

A viscous torsional vibration damper includes: a) an annular damper housing, which bounds a damper chamber; b) an inertia ring arranged in the damper chamber; c) a bearing device, which supports the inertia ring in the damper housing and which has at least one bearing element with an axial bearing region and/or a radial bearing region, d) a shear gap between the inertia ring and the damper housing, which shear gap is filled with a viscous fluid, e) wherein a plurality of the axial bearing segments and/or a plurality of the radial bearing segments is circumferentially distributed on the at least one bearing element.

13 Claims, 6 Drawing Sheets

(52) U.S. Cl.
CPC ....... *F16F 2222/08* (2013.01); *F16F 2230/32* (2013.01); *F16F 2232/02* (2013.01); *F16F 2236/08* (2013.01)

(58) Field of Classification Search
CPC ...... F16F 15/1471; F16F 15/16; F16F 15/165; F16F 15/167; F16F 15/173; F16F 15/20; F16F 15/22; F16F 15/223; F16F 15/28; F16H 2045/0221; F16H 2045/0226; F16H 2045/0263; F16C 17/10; F16C 17/107; F16C 17/102
See application file for complete search history.

(56) References Cited

U.S. PATENT DOCUMENTS

| 6,993,996 | B2 | 2/2006 | Herrmann | |
|---|---|---|---|---|
| 2013/0142462 | A1* | 6/2013 | Morishige | F16C 17/04 384/130 |

FOREIGN PATENT DOCUMENTS

| CN | 104279266 A | 1/2015 |
|---|---|---|
| DE | 195 19 261 A1 | 12/1996 |
| DE | 198 55 420 A1 | 6/2000 |
| DE | 100 46 737 C1 | 1/2002 |
| DE | 101 26 477 C1 | 12/2002 |
| DE | 10 2009 041 452 A1 | 3/2011 |
| EP | 0 745 784 B1 | 5/2000 |
| EP | 2 824 362 A1 | 1/2015 |
| EP | 2 824 362 B1 | 1/2016 |
| GB | 1 307 607 | 2/1973 |
| GB | 2 344 398 B | 7/2002 |
| JP | 49-28869 | 7/1974 |
| JP | 2007-177852 A | 7/2007 |
| WO | WO 90/13758 A1 | 11/1990 |

OTHER PUBLICATIONS

Machine Translation of EP 0,745,784, obtained Aug. 17, 2018.*
English translation of Written Opinion (PCT/ISA/237) for application No. PCT/EP2016/070340 previously submitted document C2 (German-language Written Opinion (PCT/ISA/237) previously filed Dec. 5, 2016 (nine (9) pages).
International Search Report (PCT/ISA/210) issued in PCT Application No. PCT/EP2016/070340 dated Dec. 5, 2016 with English translation (Six (6) pages).
German-language Written Opinion (PCT/ISA/237) issued in PCT Application No. PCT/EP2016/070340 dated Dec. 5, 2016 (Nine (9) pages).
German-language Office Action issued in counterpart German Application No. 10 2015 114 534.0 dated Apr. 13, 2016 (Six (6) pages).
Cover page of EP 0 423 243 published Apr. 24, 1991 (One (1) page).
Chinese-language Office Action issued in counterpart Chinese Application No. 201680050213.2 dated Feb. 26, 2019 with English translation (14 pages).
Notification under Article 94(3) EPO issued in counterpart European Application No. 16759733.5 dated Jul. 15, 2019 (eight (8) pages).

* cited by examiner

TORSIONAL VIBRATION DAMPER HAVING A BEARING DEVICE

CROSS REFERENCE TO RELATED APPLICATIONS

This application is a continuation of PCT International Application No. PCT/EP2016/070340, filed Aug. 29, 2016, which claims priority under 35 U.S.C. § 119 from German Patent Application No. 10 2015 114 534.0, filed Aug. 31, 2015, the entire disclosures of which are herein expressly incorporated by reference.

BACKGROUND AND SUMMARY OF THE INVENTION

The invention concerns a torsional vibration damper having the following features: an annular damper housing, which delimits a damper chamber; an inertia ring arranged in the damper chamber; a bearing device which supports the inertia ring in the damper housing and which has at least one bearing element with an axial bearing portion and/or a radial bearing portion; and a shear gap between the inertia ring and the damper housing, which shear gap is filled with a viscous fluid.

Torsional vibration dampers of this type serve to damp torsional vibrations on a machine shaft, frequently an engine crankshaft. On the machine shaft, the damper housing of the torsional vibration damper is connected rotationally rigidly to a machine shaft, frequently an engine crankshaft, the torsional vibrations of which are to be damped. The damper housing and the inertia ring follow the mean rotational speed of the machine shaft without slip. Their torsional vibrations however, which are superposed on the even rotation, are initially transmitted only to the damper housing. The inertia ring would rotate uniformly if it were not filled with a viscous fluid, for example a silicon oil, which fills the narrow shear gap to which the damper housing is coupled. This coupling is elastic and thus damped. Consequently, relative rotation angles occur between the damper housing and the inertia ring of e.g. up to ±1 angular degree in time with the exciting shaft vibration. Since the inertia ring can thus rotate slightly in the damper housing chamber relative to the damper housing, usually at least one bearing device is required to support it.

One essential challenge in the design of the bearing device of a torsional vibration damper is to ensure that the inertia ring in the damper chamber is mounted freely movably via the bearing device, and that a collision with the damper chamber or with the damper housing forming the damper chamber is excluded. This is achieved by establishing suitable nominal values and tolerances of the inertia ring, bearing device and damper chamber. Frequently, the installation space for the torsional vibration damper on an engine or internal combustion machine is limited. At the same time, because of the refinement of engines or internal combustion machines, requirements for the function of the rotary vibration damper are rising.

In particular, loosely inserted bearing elements have proved suitable as a bearing device, forming a plain bearing between the inertia ring and damper chamber. Thus it is known to combine a radial strip, slotted at one point on its circumference, with two axial strips—EP 0 423 243—or provide as a bearing device a plurality of axial guide plates as bearing elements—GB 1 307 607.

German Patent Document DE 195 19 261 A1 discloses a torsional vibration damper with a bearing device for guiding an inertia ring in a damper housing, in which as a bearing device at least one bearing element of L-shaped cross section is provided, which is inserted in the damper housing such that a radial bearing portion of the L-shaped bearing element supports the inertia ring radially relative to the damper housing, and an axial bearing portion of the L-shaped bearing element guarantees its axial support and guidance. Shear gaps exist between the inertia ring and the damper housing, and are filled with the viscous fluid. According to variants of this publication, it is provided that two of the L-shaped bearing elements are arranged in the inner or outer circumferential gap of the inertia ring, or one of the L-shaped bearing elements is combined with an axial strip. The L-shaped bearing elements may be configured as circumferentially closed angular rings, or be configured slotted at one place on their circumference.

German Patent Document DE 101 26 477 C1 discloses that the L-shaped bearing elements have a butt joint at one place on their circumference, which is bridged by at least one or more material webs so as to form a circumferentially closed ring. Preferably, these material webs are configured such that on a thermal length extension of the bush, they tear open or deform in an elastic-plastic fashion. According to a further variant of DE 101 26 477 C1, the butt joint is bridged by one or two material webs formed as tear webs, which lie in the alignment of the radial bearing part and/or in the alignment of the axial bearing part. It is also known that the butt joint is bridged by a material web formed as a meandering web, and that the material web is a film web.

The object of the invention is to improve the known bearings for a viscous torsional vibration damper.

The invention achieves this object by providing a viscous torsional vibration damper having the following features: an annular damper housing which delimits a damper chamber; an inertia ring arranged in the damper chamber; a bearing device, which supports the inertia ring in the damper housing and which has at least one bearing element with an axial bearing region and/or a radial bearing region; a shear gap between the inertia ring and the damper housing, and filled with a viscous fluid, wherein several of the axial bearing portions and/or several of the radial bearing portions are circumferentially distributed on the at least one bearing element.

The torsional vibration damper according to the invention obtains a whole range of advantages. Since the axial bearing portions and/or the radial bearing portions no longer extend over the entire circumference, or almost the entire circumference of the bearing element, but only three or more axial and/or radial bearing portions are provided and circumferentially distributed, the space taken up by the respective bearing element in the shear gap is reduced and, correspondingly, additional space is available, which can be filled with the viscous medium and in which a viscous coupling is possible between the inertia ring and the damper housing. This allows the usable shear gap to be maximized and the connection between the inertia ring and damper housing optimized. The axial bearing portions and/or radial bearing portions are those portions in which a plain bearing can be implemented continuously in operation in the axial or radial direction between the damper housing and the inertia ring because of these portions. Preferably, at least three of the axial bearing portions and/or the radial bearing portions are provided, circumferentially distributed on the one or on the two or more bearing elements.

In order to create large regions which are additionally filled with viscous medium, the total circumferential length of the axial and/or radial bearing portions in a preferred embodiment is less than 50%, in particular less than 40%, and particularly preferably less than 30% of the circumference of the entire bearing element.

Preferably, the circumferentially distributed radial bearing portions and axial bearing portions respectively complement each other to form bearing portions of L-shaped cross-section which are provided on the bearing element and circumferentially distributed. Such L-shaped bearing portions ensure that the inertia ring is particularly well centered and guided. Assembly is furthermore very simple in this embodiment, since the bearing element formed in this way can be placed easily in the shear gap before the damper housing, which is usually initially open on one side for installation, is closed after insertion of the bearing element and inertia ring, and filled with the viscous fluid at a filling opening to be closed later.

In a preferred variant, the at least one bearing element furthermore comprises several material webs, each of which connects together two adjacent axial bearing portions and/or two radial bearing portions. These material webs substantially facilitate assembly of the bearing elements. They are preferably dimensioned such that no plain bearing is implemented in operation, or in any case only to a very slight extent. Various variants are conceivable here. Thus it is contemplated that several of the axial bearing portions are connected together by the material webs, and these material webs are configured as axial webs.

Alternatively or optionally however, it is also contemplated that several of the radial bearing portions are connected together by the material webs, and the material webs are configured as radial webs. If only radial or only axial webs are produced, more space is available for the viscous medium. If both radial and axial webs are provided, the stability of the bearing element is improved and its assembly simplified. The material webs also serve to delimit the width of the shear gap, and in some cases act as a short-term emergency bearing if heavy loads occur in these regions during operation.

Here, it is furthermore advantageous if a strip thickness of the bearing element in the region of the material webs is less than a strip thickness in the axial bearing portions and/or in the radial bearing portions, because in this way the space taken up by the bearing element can be reduced further.

To achieve a good support, it is suitable if two of the bearing elements are arranged in the damper chamber. Theoretically, in fact, several bearing elements may be provided. Usually however, two bearing elements are sufficient to support the inertia ring. Thus installation is simple.

It is advantageous if the damper chamber has a substantially rectangular cross-section with inner and outer corner regions. Here, in one variant, two of the bearing elements may be arranged in the outer corner regions of the damper chamber between the damper housing and the inertia ring. This embodiment allows particularly simple installation. This embodiment is advantageous, but not compulsory. Other cross-sections such as C-shapes and similar are possible.

Alternatively, two of the bearing elements may be arranged in the inner corner regions of the damper chamber between the damper housing and the inertia ring.

Finally, one of the bearing elements may be arranged in one of the outer corner regions and another of the bearing elements may be arranged in one of the inner corner regions of the damper chamber between the damper housing and the inertia ring. It is preferred if the bearing elements are arranged in corner regions lying diagonally opposite each other in the damper chamber, since this provides good centering of the inertia ring.

Preferably, the bearing elements of the bearing device are arranged without preload between the damper housing and the inertia ring, in order to guarantee a good support. This is particularly preferred since this ensures good support. A preferred material for the bearing elements of the bearing device is plastic. The viscous fluid is preferably a silicon oil. The bearing elements may however also, in individual cases, be mounted with preload.

In the context of the invention, an embodiment of the bearing device is also possible in which at least one of the bearing elements comprises only axial bearing portions and only axial webs of lower strip thickness connecting these, and/or an embodiment in which one of the bearing elements comprises only radial bearing portions and only radial webs of lower thickness connecting these. These bearing elements are then preferably, but not necessarily, combined with bearing elements in which, in each case circumferentially distributed, the radial bearing portions and the axial bearing portions complement each other to form bearing portions of L-shaped cross-section. Then one of the bearing elements guides the ring preferably in the radial and axial direction, and the other guides the inertia ring only in one of these directions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
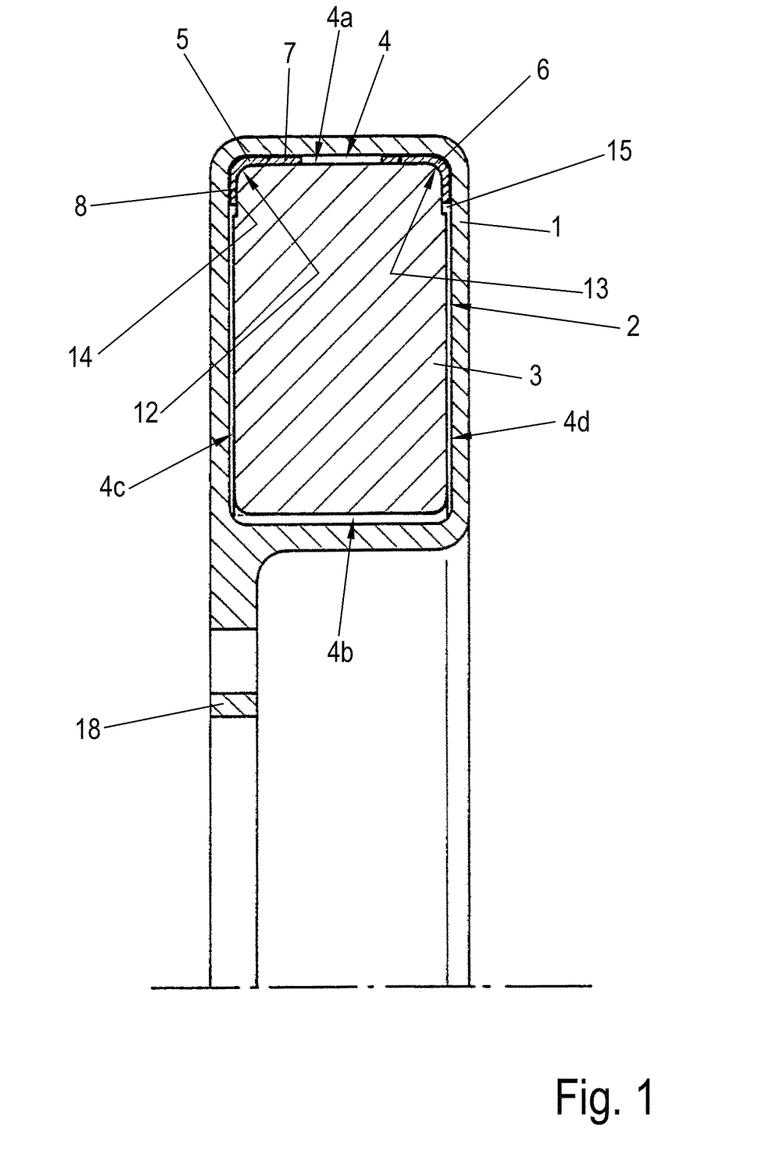
FIG. 1 is a sectional view through a ring half of a first annular viscous torsional vibration damper.

FIG. 1 shows a viscous torsional vibration damper with an annular damper housing 1 which delimits a damper chamber 2. The damper housing 1 can be connected rotatably to a machine shaft M (not shown here), in particular an engine crankshaft, the torsional vibrations of which are to be damped.

A circumferentially closed inertia ring 3 is inserted in the damper chamber 2. In a preferred but not compulsory embodiment, the inertia ring 3 here has a substantially rectangular cross-section. The inertia ring 3 is mounted by a bearing device in the damper housing 1. This is preferably arranged loosely, i.e. without preload, between the inertia ring 3 and the inner wall of the damper housing 1. In the damper chamber 2, a shear gap 4 is formed between the inner wall of the damper housing 1 and the inertia ring 3, and is filled with a damping medium, in particular a viscous fluid.

The bearing device has bearing elements 5, 6 which are configured in annular form. The bearing elements 5, 6 serve to support the inertia ring 3 in the damper housing 1 so that it is rotatable relative to the damper housing. These bearing elements 5, 6 are preferably made of plastic and each form a plain bearing between the bearing housing 1 and the inertia ring 2. The bearing elements 5, 6 are preferably made of one piece, which makes handling particularly simple, or in further embodiments they are made of two or more pieces.

Figure 2A:
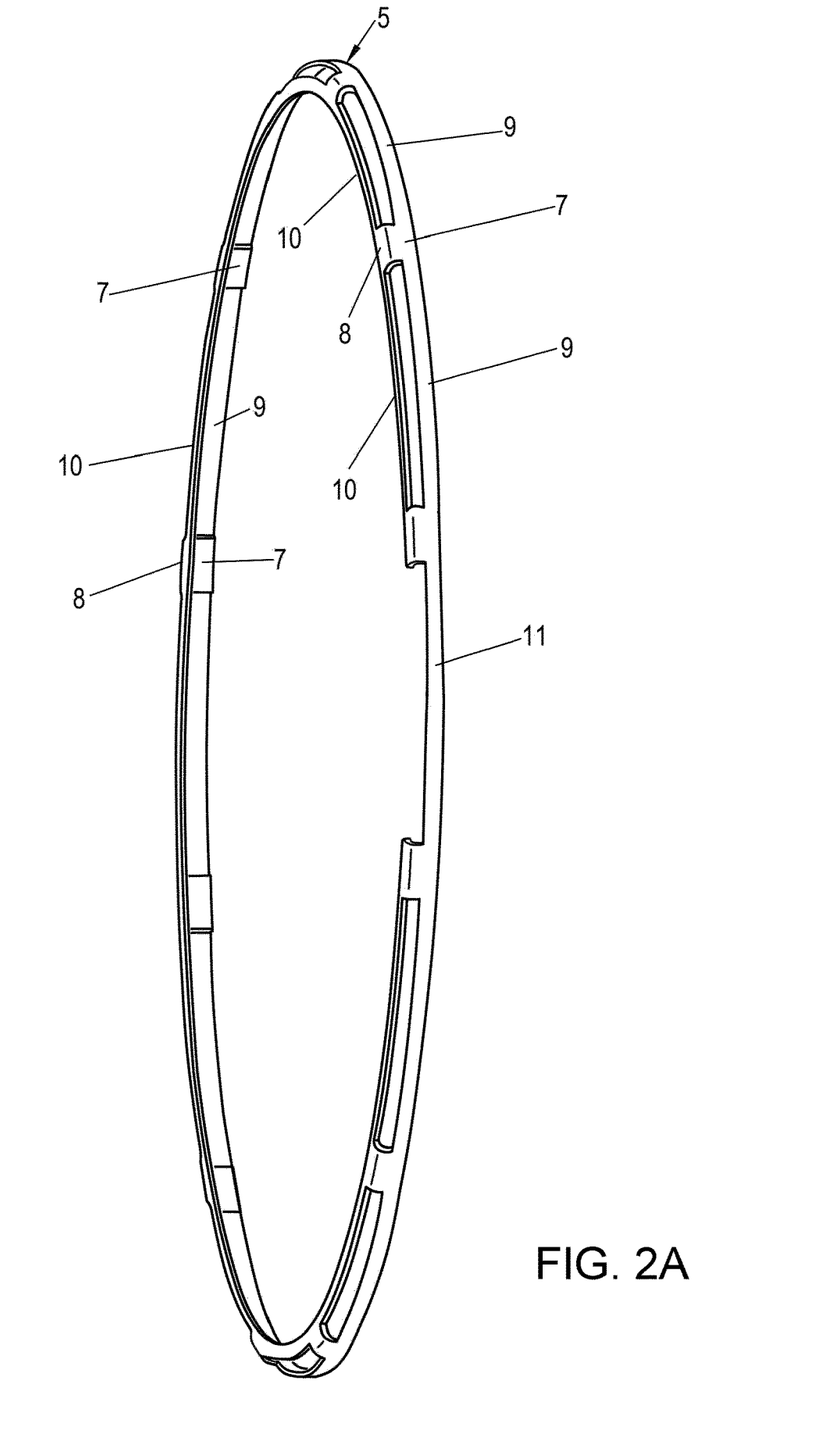
FIG. 2A is a perspective view of a bearing element configured as a ring.

FIG. 2A shows the bearing element 5. The other bearing element 6 is here configured identically to bearing element 5, so the description below also applies to bearing element 6. The identical formation of the bearing elements 5, 6 has the advantage that only one type of bearing element 5 need be provided for production. It is however also contemplated to structure the two bearing elements 5, 6 differently, so that if the inertia ring 3 is not configured rectangular in cross-section but for example stepped, support in the axial direction would be provided in various diameters (not shown here).

The bearing element 5 is configured to be annular and has, circumferentially distributed, at least two or more axial bearing portions 8 and/or at least two or more radial bearing portions 7. According to FIG. 1, the axial bearing portions 8 and the radial bearing portions 7 are arranged circumferentially distributed, preferably at corresponding angular positions, so that viewed in the cross-section of FIG. 1, circumferentially distributed L-shaped bearing portions are formed, the legs of which each form one of the axial bearing portions 8 and one of the radial bearing portions 7.

In the shear gap 4, shear gap axial regions 4c, 4d and shear gap radial regions 4a, 4b are formed between the damper housing 1 and the inertia ring 3. In all embodiments, the axial bearing portions 8 lie in the shear gap axial regions 4c, 4d, and the radial bearing portions 7 lie in the shear gap radial regions 4a, 4b. The term "radial" is used in the technology of torsional vibration dampers, and in this application in the figures and description, to designate the direction of a motor shaft (not shown) for a constant radius (which corresponds to the direction of the lower dotted lines in FIG. 1); the term "axial" designates the direction perpendicular to this for a variable radius.

The L-shaped bearing portions 5, each comprising one of the radial bearing portions 7 and one of the axial bearing portions 8, do not extend over the entire circumference of the annular bearing element 5. Rather, these are only provided in portions. They thus extend in the circumferential direction in total preferably over less than 50%, preferably over less than 40%, and in particular less than 30% of the entire circumference of the bearing element 5.

Adjacent axial bearing portions 8 of the bearing element 5 are connected together in the circumferential direction by axial webs 10. Adjacent radial bearing portions 7 are connected together in the circumferential direction by radial webs 9.

Figure 2B:
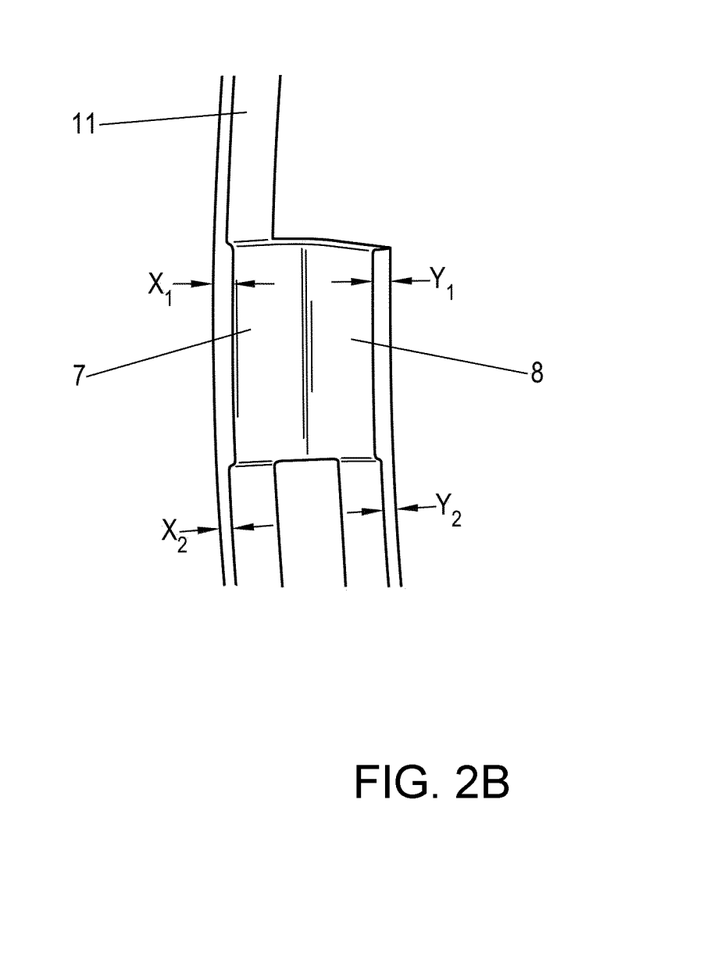
FIG. 2B is a detail view of the bearing element from FIG. 2A.

FIG. 2B shows that, at only one point of the circumferential region of the bearing element 5, a bridge web 11 (FIG. 2B) between two of the axial bearing portions 8 or the radial bearing portions 7 is dimensioned preferably thinner in the radial direction and/or in the circumferential direction than the radial webs 9; thus, said bridge web 11 can tear open on insertion in the damper housing, so that after insertion of the bearing element 5, in operation usually the bearing ring formed is not circumferentially closed but is open at one point on its circumference. In this way, different diameters and tolerance positions can be compensated. For further explanations and variants of these bridge webs 11, reference is made to DE 101 26 477 C1 cited initially.

According to an alternative embodiment, the bearing element 5 could also be configured or formed slotted at one point on its circumference, in order to compensate for tolerances.

Since the bearing portions 8, 9 no longer extend over almost the entire circumference of the bearing ring, but are only angularly distributed over portions, regions occur which can be additionally filled by the viscous medium, so that in comparison with the prior art, additional regions can be formed in which a viscous coupling is possible between the inertia ring 3 and the damper housing 1. This allows the shear gap to be maximized and the coupling between the inertia ring 3 and the damper housing 1 to be optimized. In order to create large regions which are additionally filled by the viscous medium, the total circumferential length of the axial bearing portions 8 and/or the radial bearing portions 7 should preferably cover less than said 50%, preferably less than 40%, and in particular less than 30% of the circumference of the bearing element and/or the inertia ring 3.

Preferably, the strip thickness X1 and/or Y1 of the axial bearing portions 8 and/or the radial bearing portions 7 is greater than the strip thickness X2 and/or Y2 in the region of the axial and radial webs 10, 9 connecting the bearing portions. Preferably also, the axial width of the axial bearing portions 8 and/or the radial width of the radial bearing portions 7 is greater than in the bearing portions themselves. This too brings the advantage of additional space for viscous fluid for coupling between the inertia ring 3 and the damper housing 1.

In the damper chamber 2, the bearing elements 5, 6 may be placed in the outer corner regions 12, 13 between the inertia ring 3 and the damper housing 1. For this, the inertia ring 3 in the region of the corresponding corner regions 12, 13 preferably has recesses 14, 15 which in any case extend radially, or diagonally radially and axially, and the installation depth of which is smaller than the strip thickness of the bearing elements 5, 6; this is advantageous for making the shear gap 4 narrow and keeping the space assumed by the bearing elements 5, 6 small, and for creating suitably dimensioned space for the viscous fluid in shear gap 4.

Figure 3:
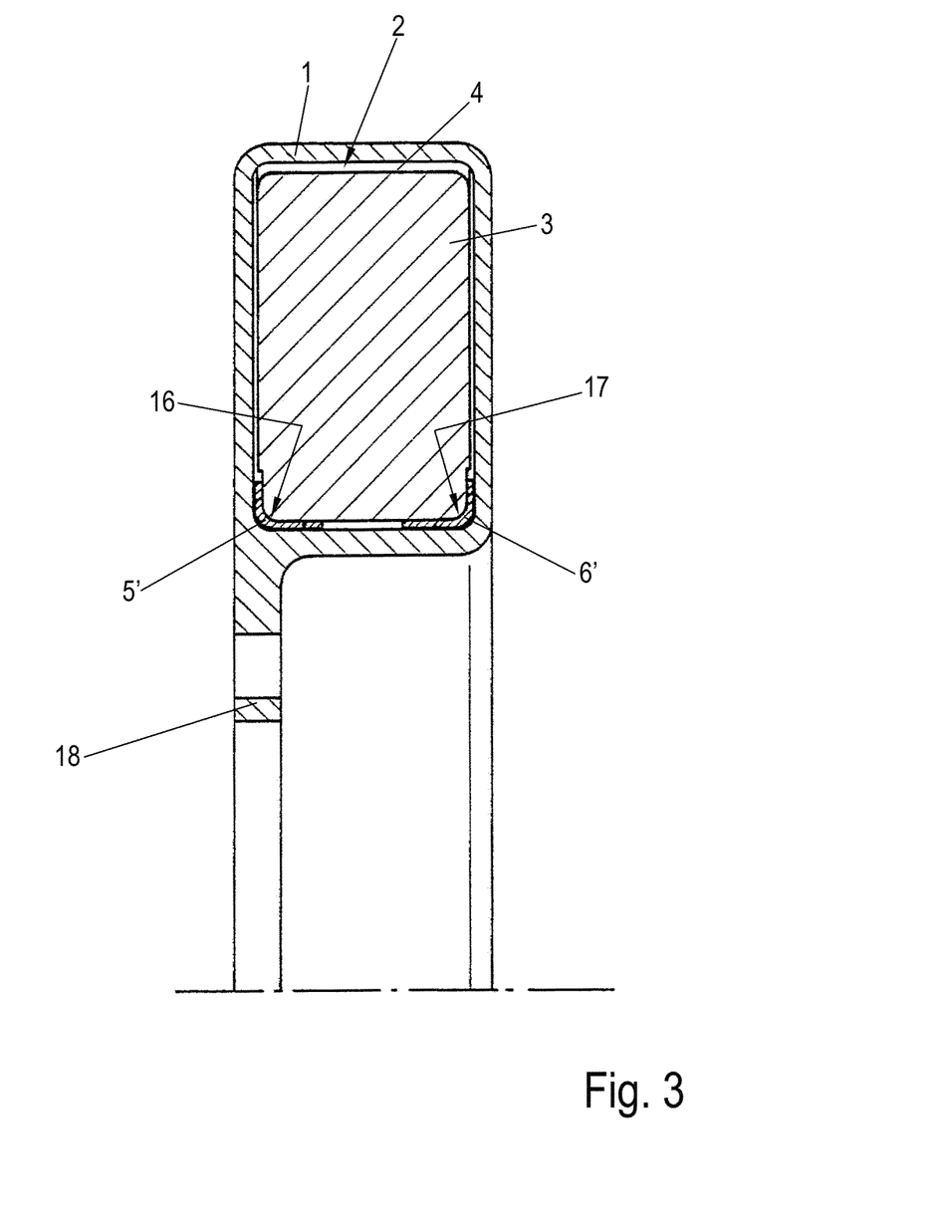
FIG. 3 is a sectional view through a ring half of a second annular viscous torsional vibration damper.

FIG. 3 shows an alternative variant of the torsional vibration damper in which the bearing elements 5', 6' are configured such that they are inserted in radially inner corner regions 16, 17 of the damper chamber 2 between the inertia ring 3 and the damper housing 1.

Figures 4A, 4B:
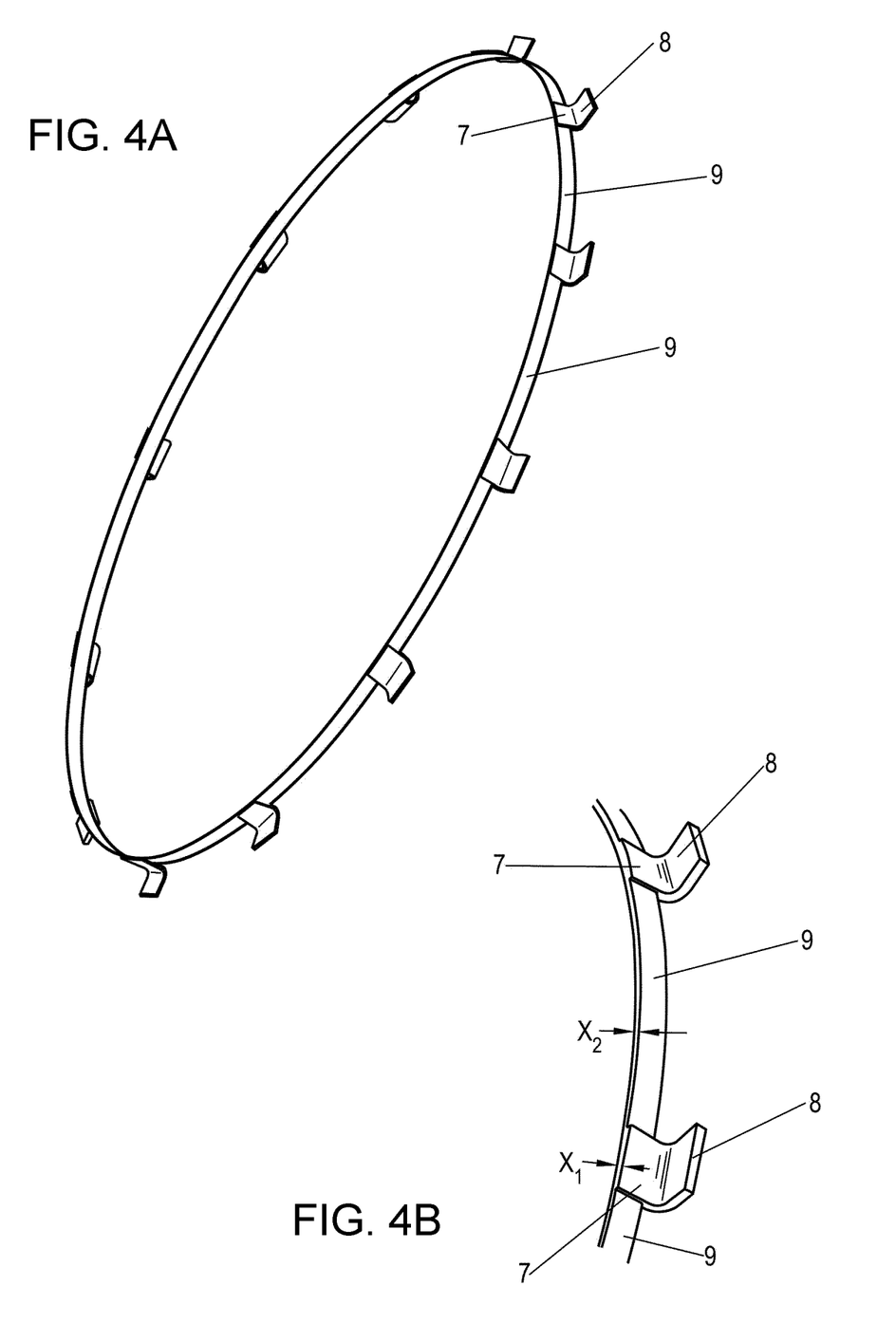
FIG. 4A is a perspective view of a further bearing element configured as a ring.
FIG. 4B is a detail view of the bearing element from FIG. 4A.

A variant of the bearing element is shown in FIGS. 4A and 4B. The bearing element of FIG. 4A is suitable for insertion in a viscous torsional vibration damper as depicted in FIG. 3. Otherwise, the structure of the viscous torsional vibration damper in FIG. 3 corresponds to that of FIG. 1.

Figure 5:
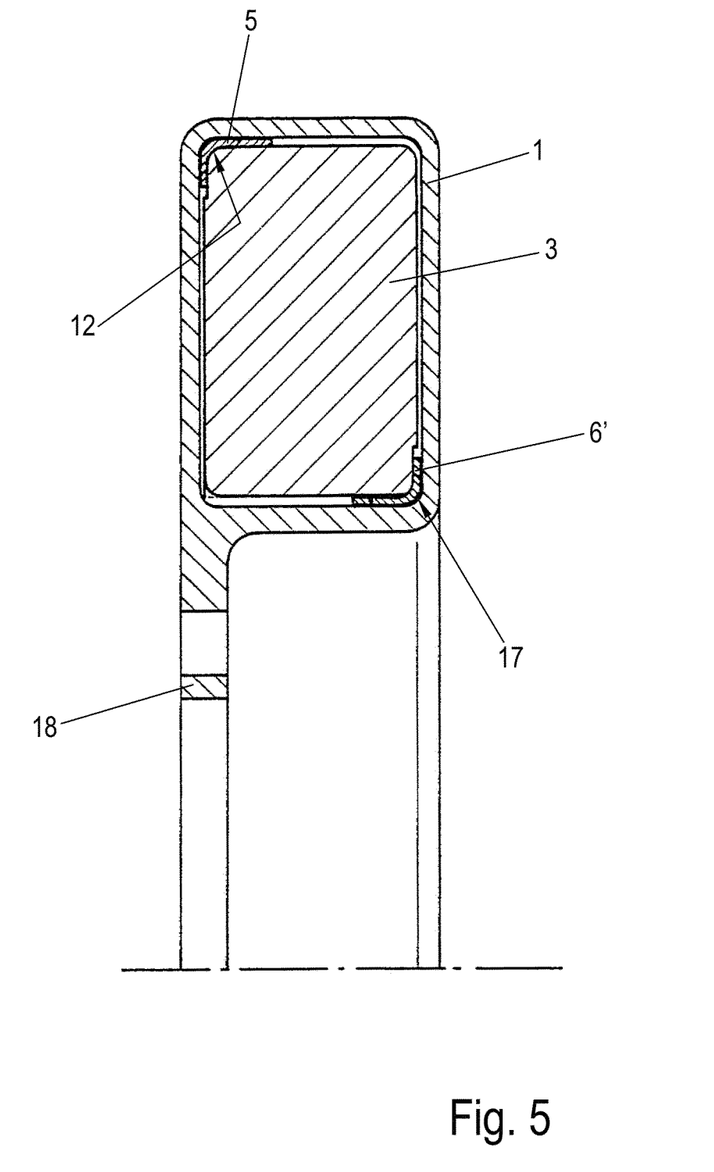
FIG. 5 is a sectional view through a ring half of a third annular viscous torsional vibration damper.

FIG. 5 shows a further variant in which one bearing element 5 is configured in the manner of FIG. 2 and inserted in an outer corner region 11 of the damper chamber 2, while the other bearing element is configured in the manner of FIG. 4A and inserted in an inner corner region 17 of the damper chamber 2. The bearing elements 5, 6 lie diagonally opposite each other, that is they are inserted in diagonally opposite corner regions 12, 17 of the damper chamber 2.

It is also possible to connect the axial bearing portions 8 and radial bearing portions 7 of the bearing elements 5, 6 together, not by axial webs 10 and radial webs 9, but just by one type of the connecting radial webs 9 and axial webs 10, i.e. either the axial webs 10 or the radial webs 9. Thus according to FIG. 4A, it is provided that only the radial bearing portions 7 are connected together by radial webs 9.

Finally, it is also contemplated (but not shown) that the axial bearing portions 8 and the radial bearing portions 7 are provided not at the same places on the circumference but circumferentially offset to each other. In this case, for example, axial bearing portions 8 would be formed on the bearing element at intervals of 40°, and radial bearing portions 7 angularly offset by 20° to these. The axial and radial bearing portions 7, 8 here again have a greater strip thickness than the axial webs and/or radial webs 10, 9 connecting these.

The damper housing 1 according to FIGS. 1, 3 and 5 has at least one portion for mounting on the machine shaft (not shown). Here, this portion is a flange 18 which extends radially inward.

LIST OF REFERENCE SIGNS

1 Damper housing
2 Damper chamber
3 Inertia ring
4 Shear gap
4a, b Shear gap radial regions
4c, 4d Shear gap axial regions
5, 5' Bearing element
6, 6' Bearing element
7 Radial bearing portion
8 Axial bearing portion
9 Radial web
10 Axial web
11 Bridge web
12 Corner region
13 Corner region
14 Recess
15 Recess
16 Corner region
17 Corner region
18 Flange
X1, Y1 Strip thickness
X2, Y2 Strip thickness The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A viscous torsional vibration damper, comprising:
   an annular damper housing, which delimits a damper chamber;
   an inertia ring arranged in the damper chamber;
   a bearing device which supports the inertia ring in the damper housing and which has at least one bearing element including a plurality of axial bearing portions and a plurality of radial bearing portions, wherein the at least one bearing element is arranged between the inertia ring and an inner wall of the damper housing; and
   a shear gap between the inertia ring and the damper housing, which shear gap is filled with a viscous fluid, wherein
   the plurality of axial bearing portions and the plurality of radial bearing portions are circumferentially distributed on the at least one bearing element,
   both of (a) and (b) are met:
   (a) the plurality of radial bearing portions and the plurality of axial bearing portions respectively complement each other to form bearing portions of L-shaped cross-section, and
   (b) several of the plurality of axial bearing portions are connected together by axial webs, and several of the plurality of radial bearing portions are connected together by radial webs, where
      a strip thickness of the several of the plurality of axial bearing portions is greater than a strip thickness in a region of the axial webs connecting together the several of the plurality of axial bearing portions, and
      a strip thickness of the several of the plurality of radial bearing portions is greater than a strip thickness in a region of the radial webs connecting together the several of the plurality of radial bearing portions, and
   wherein each of the radial webs is separated from a respective circumferentially corresponding one of the axial webs by a respective gap therebetween.

2. The viscous torsional vibration damper as claimed in claim 1, wherein
   each of the axial webs connects together two of the plurality of axial bearing portions and each of the radial webs connects two of the plurality of radial bearing portions.

3. The viscous torsional vibration damper as claimed in claim 1, wherein
   the at least one bearing element includes two bearing elements arranged in the damper chamber.

4. The viscous torsional vibration damper as claimed in claim 3, wherein
   the two bearing elements are each configured as one piece and/or made of plastic.

5. The viscous torsional vibration damper as claimed in claim 3, wherein
   at least one of the two bearing elements is configured as a ring which is circumferentially closed in mounted state.

6. The viscous torsional vibration damper as claimed in claim 3, wherein
   the plurality of axial bearing portions and the plurality of radial bearing portions include at least three axial bearing portions and at least three radial bearing portions, respectively, and
   the at least three axial bearing portions and/or the at least three radial bearing portions are circumferentially distributed on one or both of the two bearing elements.

7. The viscous torsional vibration damper as claimed in claim 1, wherein
   the damper chamber has a substantially rectangular cross-section.

8. The viscous torsional vibration damper as claimed in claim 7, wherein
   the at least one bearing element includes two bearing elements that are arranged in outer corner regions of the damper chamber between the damper housing and the inertia ring.

9. The viscous torsional vibration damper as claimed in claim 7, wherein
   the at least one bearing element includes two bearing elements that are arranged in inner corner regions of the damper chamber between the damper housing and the inertia ring.

10. The viscous torsional vibration damper as claimed in claim 7, wherein the at least one bearing element includes at least two bearing elements, and one of the at least two bearing elements is arranged on one of outer corner regions, and another of the at least two bearing elements is arranged in one of inner corner regions of the damper chamber, between the damper housing and the inertia ring.

11. The viscous torsional vibration damper as claimed in claim 10, wherein the at least two bearing elements are arranged in corner regions lying diagonally opposite each other in the damper chamber.

12. The viscous torsional vibration damper as claimed in claim 1, wherein the at least one bearing element includes at least two bearing elements, and one of the at least two bearing elements comprises only axial bearing portions and only axial webs connecting same.

13. The viscous torsional vibration damper as claimed in claim 1, wherein the at least one bearing element includes at least two bearing elements, and one of the at least two bearing elements comprises only radial bearing portions and only radial webs connecting same.

* * * * *